United States Patent
Avila et al.

(10) Patent No.: US 6,256,557 B1
(45) Date of Patent: Jul. 3, 2001

(54) VEHICLE SERIAL DATA BUS COMMUNICATION PROTOCOL AND METHOD

(75) Inventors: Andres Eduardo Avila; Victor Mendez, both of Kokomo; Kevin Joseph Hawes, Greentown, all of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/200,164

(22) Filed: Nov. 25, 1998

(51) Int. Cl.[7] ........................................ G06G 7/70
(52) U.S. Cl. .................. 701/1; 701/33; 701/36; 701/31; 701/32
(58) Field of Search .................. 701/33, 36, 31, 701/32, 48; 340/1, 436, 438

(56) References Cited

U.S. PATENT DOCUMENTS 5,436,897 * 7/1995 Cook ..................................... 370/212
5,712,764 * 1/1998 Baker et al. .......................... 361/690
5,832,397 * 11/1998 Yoshida et al. ....................... 701/29

FOREIGN PATENT DOCUMENTS 0 636 292 B1 * 1/1995 (EP) .

* cited by examiner

*Primary Examiner*—William A. Cuchlinski, Jr.
*Assistant Examiner*—Marthe Marc-Coleman
(74) *Attorney, Agent, or Firm*—Jimmy L. Funke (57) ABSTRACT

A serial data communication system and protocol for communicating data on a serial data bus in a vehicle. The serial data communication system includes a serial data bus connected to a plurality of electronic devices in a vehicle. Each of the electronic devices includes an encoder for encoding bits of information and a decoder for receiving data and decoding the received serial data. The present invention provides for a communication protocol for communicating data on the serial data bus including the steps of providing serial data to be transmitted onto the serial data bus in the vehicle. The serial data is encoded with a pulse width varying as a function of a time, and the time-based variable pulse width is assigned to groupings of at least two data bits to code each of the data bit groupings. A series of coded data bit groupings are transmitted onto the serial data bus in the vehicle, and the electronic devices may receive and decode the encoded data signals to decipher the data.

17 Claims, 7 Drawing Sheets

VEHICLE SERIAL DATA BUS COMMUNICATION PROTOCOL AND METHOD

BACKGROUND OF THE INVENTION

The present invention generally relates to a vehicle data communication system and, more particularly relates to a data communication protocol for communicating binary data between electronic devices on a data bus in a vehicle.

Modern automotive vehicles generally include various control systems with electronic devices for controlling vehicle related operations. For example, vehicles are commonly equipped with an engine control module (ECM) generally for controlling engine related operations. In addition, vehicles commonly include control systems configured about the cockpit of the vehicle, and are commonly referred to as cockpit electronics. Cockpit electronics typically include an instrument panel cluster, a driver information system, an electronic radio, a heating, ventilation, and air condition (HVAC) system, and a bead-up display (HUD). At least some of the aforementioned control systems are commonly interconnected by way of a serial data bus for communicating data between the various control systems. The serial data bus typically includes a data line for transmitting serial data bits, as well as a ground line for providing a common ground reference, and a common power line which feeds each of the control system devices to provide electrical power thereto.

Conventionally, the various control systems on a vehicle communicated via the serial data bus by way of a pulse width modulation (PWM) coding, in which each data bit is encoded, and subsequently decoded by sampling the bit at the halfway point. If the voltage level is positive, then the data bit is decoded as a binary "1" value, otherwise the data bit is decoded as a binary "0" value. According to the conventional pulse width modulation coding approach, two voltage pulse edges are generally required to define each bit of data. This approach requires a relatively large number of voltage pulse edges for coding, which can adversely contribute to RF emissions (e.g., noise).

More recently, another encoding approach, referred to as variable pulse width (VPW), has been commercially employed with the SAE J1850 Class II communication bus for use on automotive vehicles. According to the variable pulse width data coding approach, a binary "1" value is assigned to a short high pulse or a long low pulse, while a binary "0" value is assigned to a long high pulse or a short low pulse, respectively. According to the variable pulse width coding approach, only one edge is required to define one bit of data, which thus reduces RF emissions as compared to the pulse width modulation approach.

While the pulse width modulation and variable pulse width approaches have offered suitable data communication in an automotive vehicle, such approaches do not minimize cost and RF emissions. There exists the desirability to minimize the number of voltage pulse edges that are required to define each bit of data for communication between control systems on a vehicle bus. In addition, there exists a need to provide for a fast data bit rate, while reducing the cost per node. Yet, it is also desirable to allow for vehicle data communication which may accommodate less expensive data communication timing devices.

It is, therefore one object of the present invention to provide for enhanced vehicle communication protocol for communicating data on a serial data bus of a vehicle. It is another object of the present invention to provide for fast data bit rates with reduced emissions. It is a further object of the present invention to provide for a reduced cost vehicle communication system, particularly for components employed at each node in the vehicle. It is yet another object of the present invention to provide for priority message arbitration which allows for a master-less bus arrangement.

SUMMARY OF THE INVENTION

The present invention provides for a serial data communication system and protocol for communicating data on a serial data bus in a vehicle. The serial data communication system includes a serial data bus connected to a plurality of electronic devices in a vehicle. Each of the electronic devices includes an encoder for encoding bits of information and a decoder for receiving data and decoding the received serial data. The present invention provides for a communication protocol for communicating data on the serial data bus including the steps of providing serial data to be transmitted onto the serial data bus in the vehicle. The serial data is encoded as a function of a time-varying based pulse width and the time-based variable pulse width is assigned to groupings of at least two data bits so as to code each of the data bit groupings. A series of coded data bit groupings are transmitted onto the serial data bus in the vehicle. The electronic devices may receive and decode the encoded data signals to decipher the data.

These and other features, advantages and objects of the present invention will be further understood and appreciated by those skilled in the art by reference to the following specification, claims and appended drawings.

DETAILED DESCRIPTION OF THE PREFERRED EMBODIMENT

Figure 1:
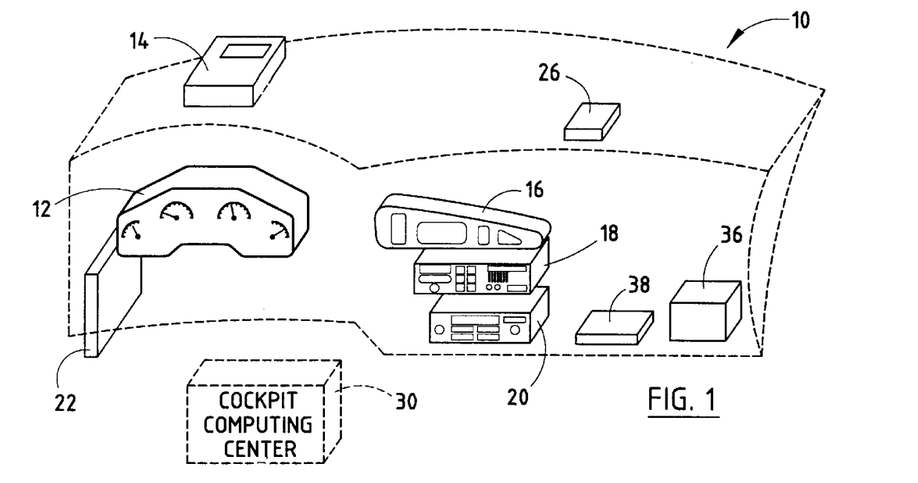
FIG. 1 is an illustration of the cockpit electronics employed in a vehicle including those that communicate data via a data communication protocol according to the present invention.

Referring to FIG. 1, the cockpit 10 of an automotive vehicle is generally shown equipped with vehicle cockpit electronics located in the frontal cockpit area as is generally provided in front of the passenger seating area. The vehicle cockpit electronics include an instrument panel cluster 12 which typically contains various vehicle related electronic instruments such as a vehicle speedometer, engine speed instrumentation, fuel tank instrumentation, etc. The vehicle cockpit electronics further includes a head-up display 14, a driver information system 16, an electronic radio 18, and a heating, ventilation, and air conditioning system 20. The vehicle cockpit electronics may further include a body computer 22, a remote keyless entry system 26, an audio amplifier block 38, and a fuse block/bussed electrical center 36.

Some or all of the cockpit electronics are preferably each equipped with a microprocessor and memory for processing data and for further controlling data transmission on a serial data communication bus. The cockpit electronics architecture may be configured as a master-less bus or a master/slave bus. Alternately, a cockpit computing center 30 may be employed to handle at least some of the processing at the central computing center 30, to thereby simplify the electronics in the various cockpit electronics. The use of a central computer center in a vehicle cockpit is disclosed in commonly assigned co-filed U.S. patent application Ser. No. 09/200,160 entitled "INTEGRATED VEHICLE COCKPIT ELECTRONICS ARCHITECTURE," which is hereby incorporated by reference.

Figure 2:
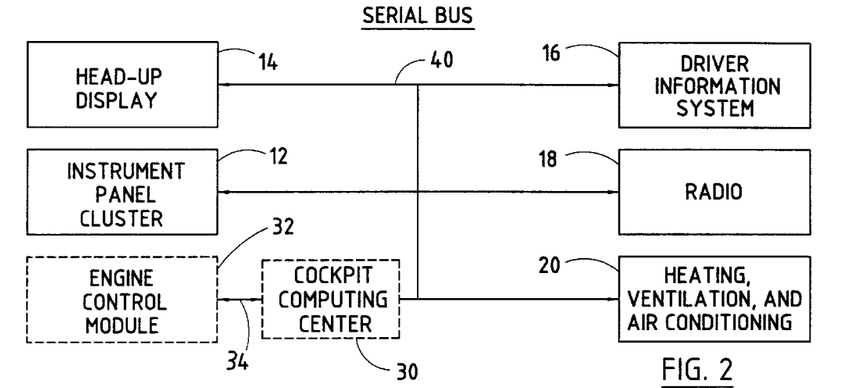
FIG. 2 is a block diagram further illustrating the vehicle cockpit electronics coupled to a serial data bus.

Referring to FIG. 2, the vehicle cockpit electronics, including the head-up display 14, instrument panel cluster 12, driver information system 16, electronic radio 18, and heating, ventilation, and air conditioning system 20, are further shown connected together by way of a vehicle cockpit serial data communication bus 40. Serial data communication bus 40 is a two-way data communication bus that allows for communication of serial data to and from vehicle cockpit electronics. Serial communication bus 40 includes a data line for transmitting binary high and low data bits of information, thus forming messages. In addition, the serial data bus 40 may further include a ground line and a power line for supplying a common ground and power supply to each of the vehicle cockpit electronics. Accordingly, the serial data communication bus 40 may have three wires to handle each of the data, ground, and power supply.

In addition, the serial data bus 40 may be further connected to the vehicle's main communication bus or any other bus via electronic devices on the vehicle. For example, data communication with the vehicle's main bus 34 allows the vehicle electronics to communicate data with remote vehicle subsystems such as the engine control module 32. If a cockpit computing center 30 is employed, the cockpit serial bus 40 is preferably connected to the vehicle's main bus 34 through the cockpit computing center 30.

The vehicle cockpit electronics, together with the serial data bus 40 and the cockpit computing center 30, if employed, form a cockpit communication system. The vehicle cockpit electronics are interconnected to share a common serial data bus 40 and are able to communicate serial data in accordance with the communication protocol of the present invention. The communication protocol of the present invention advantageously offers fast data bit rates, reduced transitions which reduces radiated emission (e.g., noise), and reduced cost per node. While the communication protocol of the present invention is described herein in connection with use for cockpit electronics in a vehicle, it should be appreciated that the communication protocol may also be employed for communicating data between other electronic devices used in the vehicle.

Figure 3:
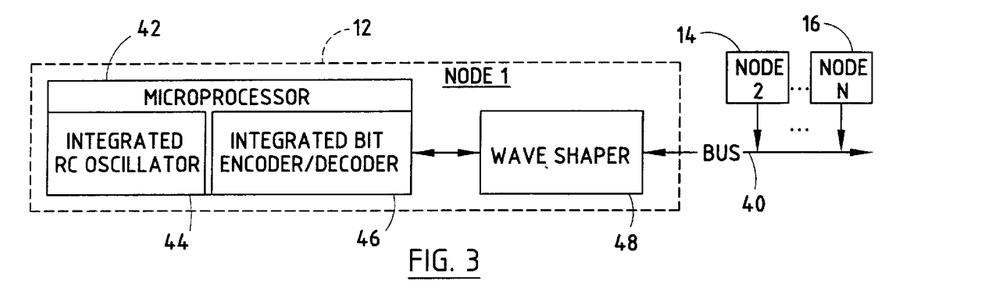
FIG. 3 is a block diagram further illustrating the vehicle cockpit electronics data communication hardware.

Each of the vehicle cockpit electronics is preferably configured to encode binary bits of data and transmit the encoded data onto the serial data bus 40, and is further capable of receiving and decoding the received data from the serial data bus 40. Turning to FIG. 3, one example of a vehicle electronics device, such as the instrument panel cluster 12, is shown having a microprocessor 42 and a wave shaper 48. Each electronic device connected to the data bus 40 is also referred to herein as a node. The microprocessor 42 preferably includes an integrated RC oscillator 44 and an integrated bit encoder/decoder 46. The integrated RC oscillator 44 provides timing, preferably within an acceptable clock tolerance and, according to the present invention, may employ a timing device with a wider clock tolerance than is normally acceptable with known vehicle protocol techniques. The integrated bit encoder/decoder 46 provides for the decoding and encoding of the transmitted and received data, respectively. Each of the other vehicle electronics, such as the head-up display 14 and driver information system 16 are likewise connected to the serial data bus 40 to provide other nodes, and each likewise includes similar electronics for encoding and decoding data and for transmitting and receiving encoded data to and from the serial data bus 40.

The data communication protocol of the present invention provides a coding technique which requires only one voltage pulse edge per two bits of data. A discussion of the coding technique is as follows. Two bits of binary data are encoded per each voltage pulse edge of the coded signal. This provides four bits of coding for each complete bus cycle. For the first bus half-cycle, four different pairs of binary bits, also referred to as data slices, can be defined as follows:

If $t_{min} < t_w < t_1$ then data slice =00

If $t_1 < t_w < t_2$ then data slice =01

If $t_2 < t_w < t_3$ then data slice =10

If $t_3 < t_w < t_4$ then data slice =11 where $t_w$ identifies the pulse width time between voltage pulse edges. The same coding defining each data slice can likewise be applied to the second half of the bus cycle as follows:

If $t_{min} < t_w < t_1$ then data slice =11

If $t_1 < t_w < t_2$ then data slice =10

If $t_2 < t_w < t_3$ then data slice =01

If $t_3 < t_w < t_4$ then data slice =00 This provides for a variable time data coding technique for encoding four bits of information provided on a single bus cycle.

Figure 4:
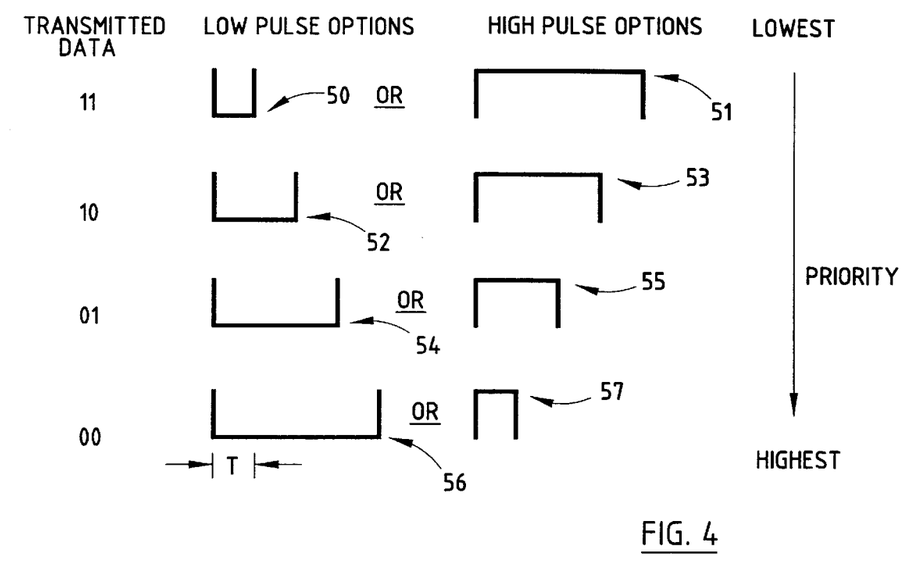
FIG. 4 illustrates the time-based data coding for encoding pairs of data bits according to the communication protocol of the present invention.

Referring to FIG. 4, the pulse duration for binary data coding according to the data communication protocol of the present invention is provided according to one example. As shown, the binary data that is to be transmitted can be encoded in groups of at least two binary digits. The transmitted data representing binary digits "11" can be designated by either a short low pulse 50 with a time duration of T or a long high pulse 51 with a time duration of 4T. Transmitted data representing binary digits "10" can be defined by a longer low pulse 52 with a time duration of 2T or a shortened high pulse 53 with a time duration of 3T. Similarly, transmitted data having binary digits "01" is represented by a longer low pulse 54 with a time duration of 3T or a shorter high pulse 55 with a time duration of 2T. The transmitted data identified by binary digits "00" is represented by the longest low pulse 56 with a time duration of 4T or the shortest high pulse 57 with a time duration of T. Accordingly, one through four variable time intervals of either high or low voltage pulse levels are required to identify two bits of binary data.

In addition, the transmitted data is assigned a priority level for purposes of arbitration. In the example shown, binary digits "00" is assigned the highest priority, which determines arbitration priority amongst the various electronic devices. It should be appreciated that while binary digits "00" is assigned the highest priority in the example shown, other priority designations may be made without departing from the teachings of the present invention.

Figure 5:
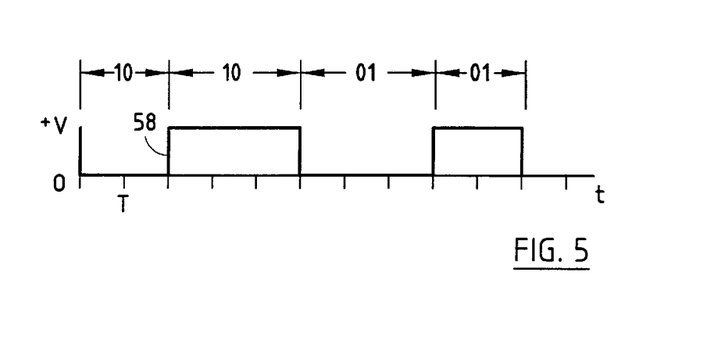
FIG. 5 is a timing diagram illustrating a data stream for one example of a byte transmission employing the protocol encoding of the present invention.

Referring to FIG. 5, one example of a byte transmission employing the data communication protocol of the present invention is shown therein. The resulting data stream of the sample byte allows for coding two bits of binary data per each voltage edge 58, and therefore provides for four bits of binary data for each complete bus cycle. This provides for a reduced number of voltage pulse edges that are needed to encode the same data as compared to the conventional vehicle cockpit communication systems.

Figure 6A:
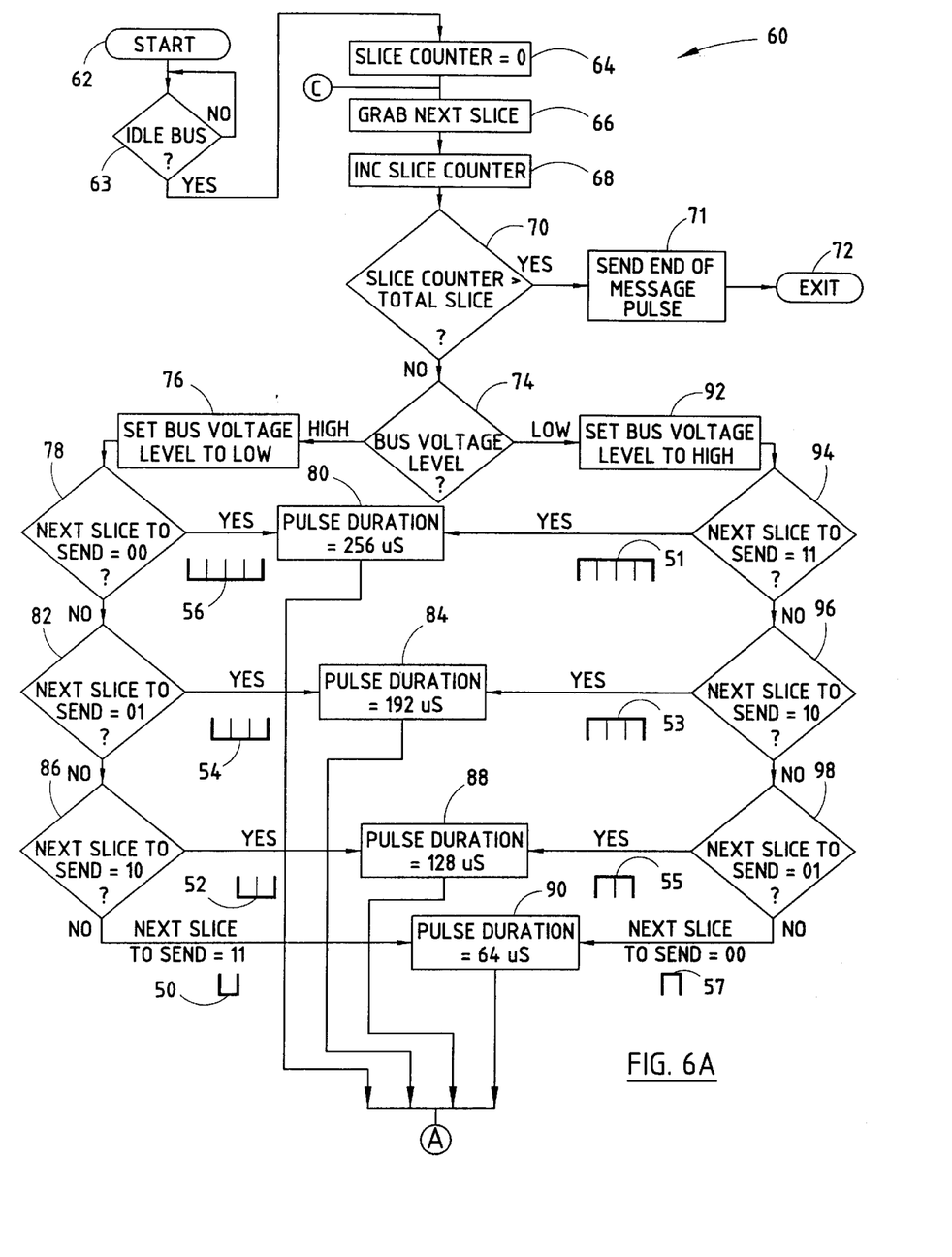
FIGS. 6A and 6B together provide a flow diagram illustrating a methodology of encoding serial data bits according to the present invention.
Figures 6B, 7A:
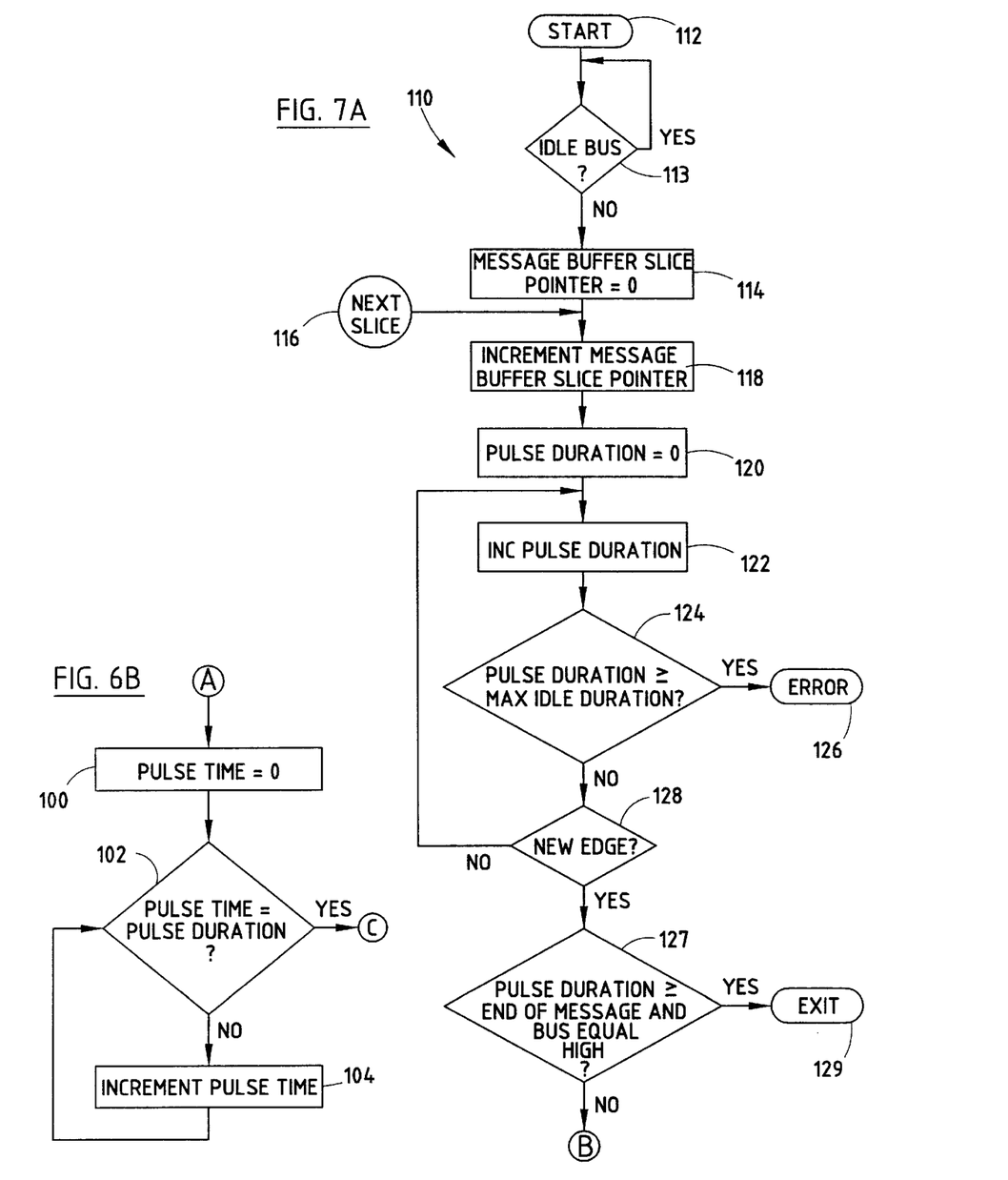
FIG. 7A and 7B together provide a flow diagram illustrating a methodology of decoding the serial data bits according to the present invention.

The vehicle cockpit serial data communication protocol is shown in detail in FIGS. 6A and 6B, and FIGS. 7A and 7B for a methodology 60 of encoding data and a methodology 110 of decoding data, respectively. Referring to FIGS. 6A and 6B, the methodology 60 for encoding binary bits of serial data for transmission onto the serial data bus is shown therein. Encoding methodology 60 starts with step 62 and proceeds to decision block 63 to check for an idle bus. Methodology 60 waits for an idle bus, and then proceeds to set a slice counter equal to 0 in step 64. A slice is defined herein as two data bits. The next slice made available is grabbed in step 66 and the slice counter is incremented in step 68. Encoding methodology 60 compares the slice counter to a total slice value in decision block 70 and, if the value in the slice counter exceeds the total slice value, methodology 60 proceeds to send an end of message pulse in step 71 and then exits the routine pursuant to step 72. Next, encoding methodology 60 proceeds to decision block 74 to determine the bus voltage level. If the bus voltage level is high, methodology 60 proceeds to step 76 to set the bus voltage level to low and then proceeds to compare the slice to the designated low pulse slice codings. Included in the coding comparisons is decision block 78 which compares the next slice to send with the slice equal to "00." If the next slice equals "00," the pulse duration is set equal to a time of 256 microseconds in step 80. In decision block 82, if the next slice to send is equal to "01," step 84 sets the pulse duration equal to a time of 192 microseconds. If the next slice to send is equal to "10" as determined by decision block 86, step 88 sets the pulse duration equal to a time of 128 microseconds. If the next slice is not determined to be equal to any of "00," "01," or "10," decision block 86 determines that the next slice is equal to "11," and proceeds to step 90 to set the pulse duration equal to a time of 64 microseconds.

Returning back to decision block 74, if the bus voltage level is determined to be low, encoding methodology 60 proceeds to step 92 to set the bus voltage level to high and then proceeds to compare the next slice to send with the designated high pulse slice codings. Included in the coding comparisons is decision block 94 for determining if the next slice to send is equal to "11," and, if so, proceeds to step 80 to set the pulse duration equal to a time of 256 microseconds. If the next slice to send is equal to "10" as determined in as decision block 96, step 84 sets the pulse duration equal to a time of 192 microseconds. If the next slice to send is equal to "01" as determined in decision block 98, the pulse duration is set equal to a time of 128 microseconds as set forth in step 88. Otherwise, if none of the above slice coding are detected, the next slice to send is set equal to "00," and step 90 proceeds to set the pulse duration equal to a time of 64 microseconds.

Once the pulse duration for the next slice is determined, encoding methodology 60 proceeds to step 100 as shown in FIG. 6B. Step 100 sets the pulse time equal to 0 and proceeds to decision block 102 to determine if the pulse time is equal to the pulse duration. If the pulse time is equal to the pulse duration, methodology 60 proceeds back to step 66 to grab the next slice of data. Otherwise, methodology 60 proceeds to step 104 to increment the pulse timer until the pulse time equals the pulse duration, at which point methodology 60 then proceeds to grab the next slice.

Accordingly, encoding methodology 60 repeatedly encodes one slice (e.g., two binary bits) at a time in a manner that provides one voltage pulse edge per each slice, and therefore provides two slices of data for each complete bus cycle. The encoded data is transmitted onto the serial data bus 40 and is made available to the electronic devices having data access thereto. The electronic devices may therefore share data, and may receive the encoded data from the serial data bus 40. To decipher the data received from the serial data bus 40, each electronic device preferably includes its own decoder for decoding the encoded data as described hereinafter.

Figure 7B:
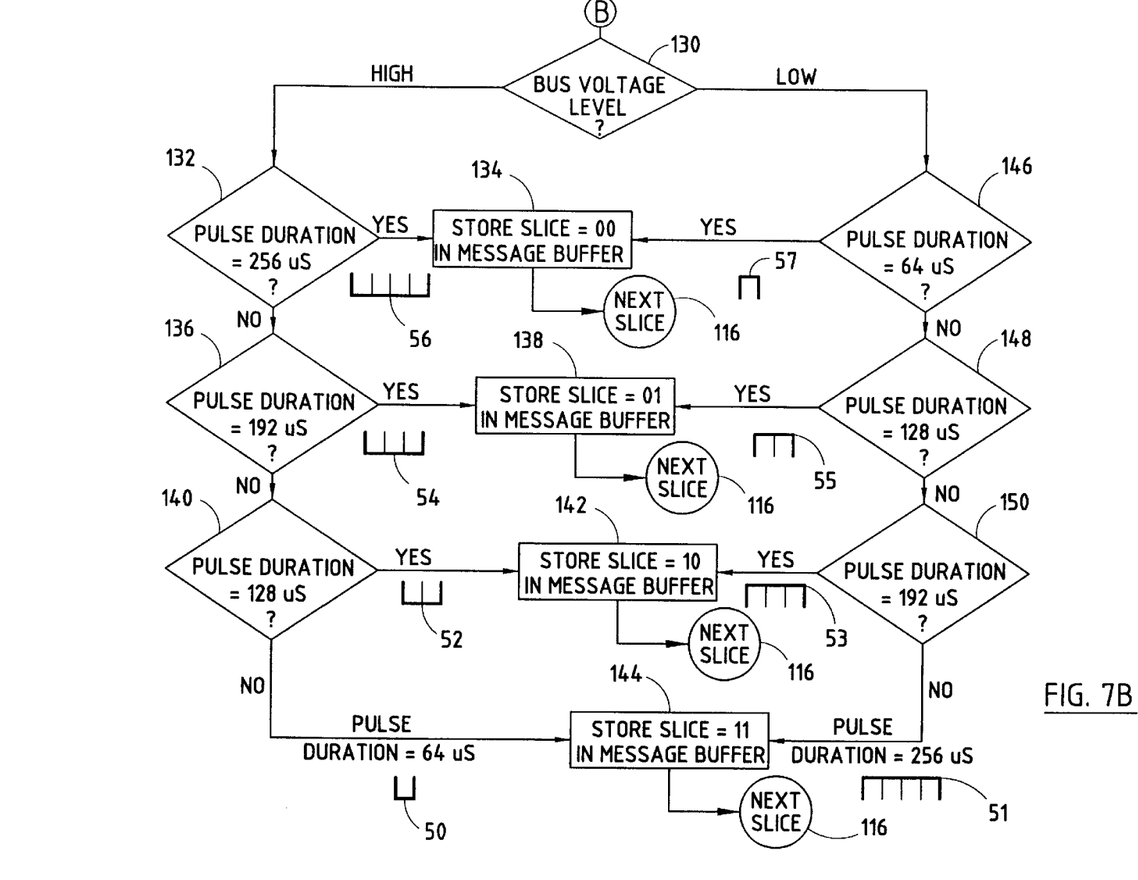

Referring to FIGS. 7A and 7B, a decoding methodology 110 is illustrated therein for decoding the encoded data as set forth in the communication protocol of the present invention. Decoding methodology 110 begins at step 112 and proceeds to check for an idle bus in decision block 113. Methodology 110 waits for an edge to occur, and then proceeds to set a message buffer slice pointer equal to 0 in step 114. The next received slice is grabbed in step 116. Methodology 110 then proceeds to step 118 to increment the message buffer slice pointer, and then advances to step 120 to set the pulse duration equal to 0. In step 122, methodology 110 proceeds to increment the pulse duration and proceeds to decision block 124 to determine if the pulse duration is greater than or equal to the maximum idle duration, and, if so, proceeds to enter an error condition at step 126. If the pulse duration is determined not to be greater than or equal to the maximum idle duration, decoding methodology 110 proceeds to decision block 127 to check if the pulse duration is greater than or equal to the end of message and if the bus is equal to high and, if so, proceeds to exit in step 129. Otherwise, methodology 110 proceeds to decision block 128 to determine if a new edge is present, and, if a new edge is not present, returns to step 122. However, if a new edge is present, decoding methodology 110 proceeds to decision block 130 to determine if the bus voltage level is high or low, as is particularly shown in FIG. 7B.

If the bus voltage level is determined to be high, decoding methodology 110 proceeds to compare the pulse duration to a series of designated time periods. Included is decision block 132 which compares the pulse duration with a time period of 256 microseconds, and if equal, proceeds to step 134 to store the current slice equal to "00" in the message buffer, and then proceeds to grab the next received slice in step 116. Block 136 compares the high pulse duration to a time period of 192 microseconds and, if equal, proceeds to step 138 to store the current slice equal to "01" in the message buffer, and then proceeds to grab the next received slice in step 116. If the high pulse duration is equal to a time period of 128 microseconds as determined in decision block 140, step 142 stores the current slice equal to "10" in the message buffer, and then proceeds to grab the next received slice in step 116. Otherwise, provided a high pulse duration is present, methodology 110 proceeds to step 144 to store the current slice equal to "11" in the message buffer, and then proceeds to grab the next received slice in step 116.

If the bus voltage level is determined to be low in decision block 130, decoding methodology 110 similarly proceeds to compare the pulse duration to a set of predetermined time periods. If the pulse duration is determined to be equal to a time period of 64 microseconds in step 146, methodology 110 proceeds to step 134 to store the current slice equal to 00 in the message buffer, and then proceeds to grab the next received slice in step 116. If the pulse duration is determined in step 148 to be equal to a time period of 128 microseconds, step 138 stores the current slice equal to "01" in the message buffer, and then proceeds to grab the next received slice in step 116. If the pulse duration is determined in step 150 to be equal to a time period of 192 microseconds, step 142 proceeds to store the current slice equal to "10" in the message buffer, and then proceeds to grab the next received slice in step 116. Otherwise, a low pulse duration is determined to be equal to a time period of 256 microseconds and step 146 proceeds to store the current slice equal to "11" in the message buffer, and then proceeds to grab the next received slice in step 116. Similar to the encoding methodology 60, the decoding methodology 110 proceeds to continuously decipher consecutive bits of data.

At each node on the serial data bus 40, the corresponding electronic device is typically required to have an accurate timing and maintain data synchronization to the other electronic devices on the serial data bus 40. In the past, the timing accuracy requirements have typically required an accurate crystal or resonator. The communication protocol of the present invention advantageously allows for a widened node clock tolerance, such that a simple RC resonator can be used as the node oscillator, thereby allowing for use of less expensive timing devices. In addition, the communication protocol of the present invention provides the benefit of synchronization for each slice, thus allowing wider clock variance on each of the electronic devices.

Figure 8:
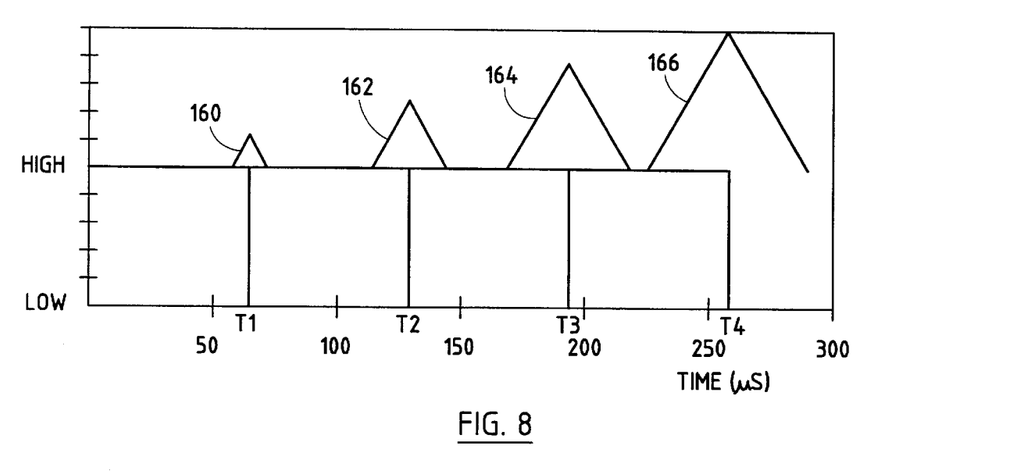
FIG. 8 is a graph illustrating a time-based data spread taken employing a timing clock having a clock tolerance of 12.5%.

To reduce crystal/resonator costs, and allow for use of a cheaper timing device, such as an RC oscillator with a clock tolerance of ±7.5%, the communication protocol of the present invention further employs the coding technique as set forth hereinafter to widen the clock tolerance range. Referring to FIG. 8, a data spread versus clock variation is shown with a 12.5% clock tolerance. Included are four high pulse combinations superimposed on the same graph with triangles whose base marks the individual edge time spreads 160, 162, 164, and 166 above each falling edge at times T1, T2, T3, and T4 (64 microseconds, 128 microseconds, 192 microseconds, and 256 microseconds), respectively representing the amount of variation that the corresponding edge experiences with a varying clock of 12.5% tolerance. As shown, the margin between the falling edges T3 and T4 is 8 microseconds, which is due to the fact that edge T3 does not rise up to half of the 64 microsecond interval time.

Figure 9:
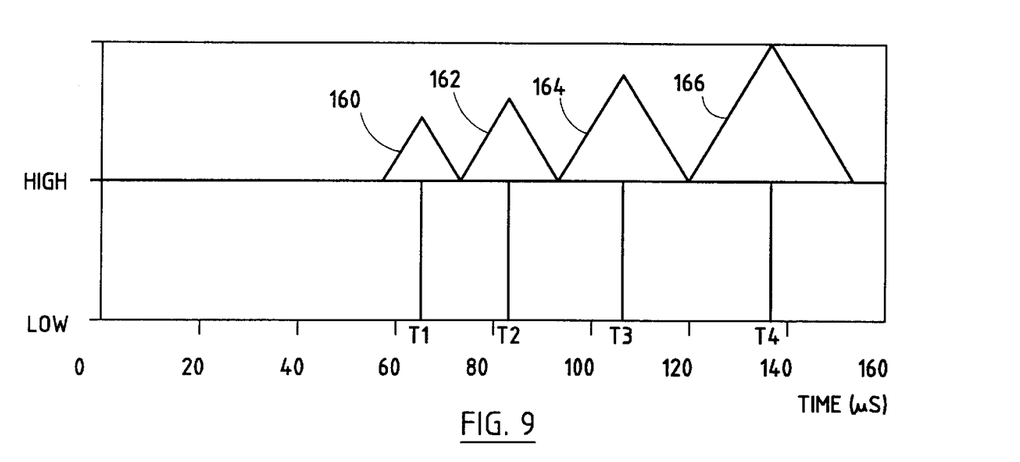
FIG. 9 is a graph illustrating a compensated interval time with the data spread plotted in FIG. 8.
Figure 10:
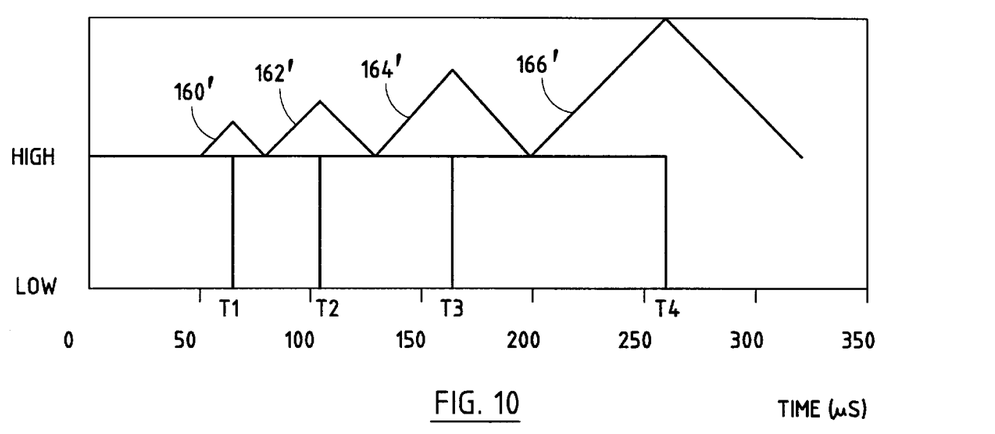
FIG. 10 is a graph illustrating the compensated interval time converted to a time period of 256 microseconds.

Referring to FIG. 9, the values of the falling edges at T2, T3, and T4 have been adjusted by shortening to remove the unused margin between the pulses. However, falling edge T1 was kept at 64 microseconds to maintain the rise and fall times of the hardware. As falling edges T2, T3, and T4 were shortened in time, the total time variation also was reduced, thereby further reducing the total time of the message. Still further, the clock variation or tolerance is adjusted so that the falling edge T4 is at 256 microseconds, as shown in FIG. 10, to provide adjusted triangles 160', 162', 164', and 166'.

Figure 11:
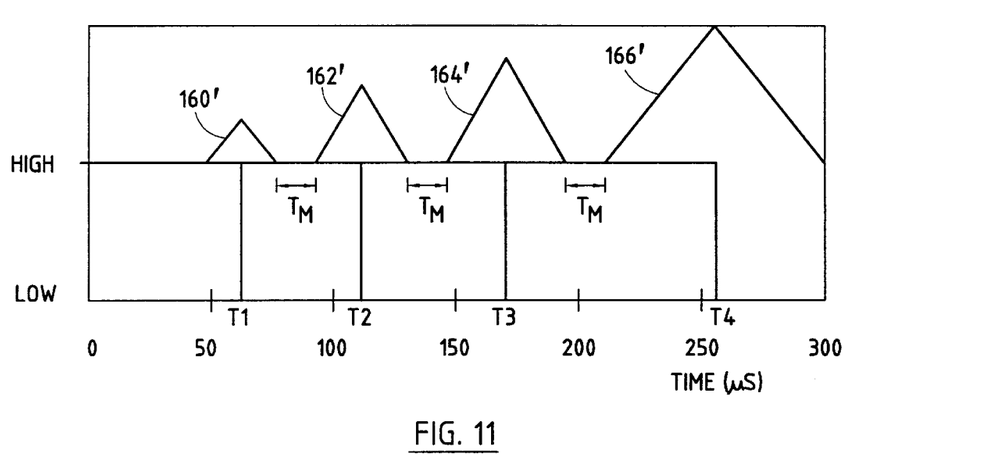
FIG. 11 is a graph illustrating adjusted interval ratios with a 16.0% clock tolerance and the addition of a 17 microsecond time margin.

In addition, a safety margin $T_m$ is introduced between the windows of the triangle base which is referred to herein as the minimum margin and is shown in FIG. 11. The minimum margin $T_m$ is a fixed time added between the maximum edge variation which allows voltage for rise and fall time hardware variations. For the example shown, the clock variation is set to 16% and the minimum margin is adjusted so that the falling edge T4 equals 256 microseconds to achieve a margin of $T_m$=17 microseconds. The resulting data communication protocol as shown in FIG. 11 allows the use of lower cost RC oscillators at each node, has reduced radiation, and has a greater chance of being implemented on the product microprocessors due to the fact that there are fewer edges, in that fewer interrupts results in less processing power requirements.

It will be understood by those who practice the invention and those skilled in the art, that various modifications and improvements may be made to the invention without departing from the spirit of the disclosed concept. For example, the active high or low voltage levels as well as the priority assigned to data bit grouping can be arbitrarily chosen by the user. The scope of protection afforded is to be determined by the claims and by the breadth of interpretation allowed by law.

The invention claimed is:

1. A serial data communication system in a vehicle, said communication system comprising:
   a plurality of electronic devices associated with the vehicle;
   a serial data bus connected to each of said plurality of electronic devices for allowing communication of serial data;
   an encoder associated with each of said plurality of electronic devices for encoding bits of information, said encoder encoding one of a high and low binary coding for each grouping of at least two data bits, said encoding providing a variable pulse width as a function of time for different ones of said data groupings; and
   a decoder associated with each of said plurality of electronic devices for receiving data from said data bus and for decoding said received data.

2. The communication system as defined in claim 1, wherein each of said plurality of electronic devices further comprises a microprocessor.

3. The communication system as defined in claim 1, wherein at least some of said plurality of electronic devices comprise vehicle cockpit electronics.

4. The communication system as defined in claim 1, wherein each of said electronic devices includes a timing device having a timing tolerance larger than 1%.

5. The communication system as defined in claim 4, wherein said serial data communication system provides a data spread as a function of time, wherein said data spread is adjusted in time to remove time margins between adjacent pulses.

6. The communication system as defined in claim 5, wherein said data spread is further adjusted by providing a uniform minimum time margin between adjacent pulses.

7. The communication system as defined in claim 1, wherein said encoder encodes only a high or low voltage pulse.

8. A communication protocol for communicating data on a serial data bus in a vehicle, said communication protocol comprising the steps of:
   providing serial data that is to be transmitted onto a serial data bus in a vehicle;
   providing groupings of at least two data bits;
   encoding said serial data by providing a high or low time-based variable pulse width to each of said data bit groupings to code each of said data bit groupings;
   transmitting a series of said encoded data bit groupings onto the serial data bus in the vehicle;

receiving said encoded data from said serial data bus with an electronic device; and decoding said received encoded data to decipher said data.

9. The communication protocol as defined in claim 8, wherein said communication protocol is employed for communicating data between vehicle cockpit electronics.

10. The communication protocol as defined in claim 8 further comprising the step of providing a timing signal having a timing tolerance larger than 1%.

11. The communication protocol as defined in claim 10 further comprising the steps of:

generating a data spread as a function of time; and adjusting the data spread to remove time margins between adjacent pulses.

12. The communication protocol as defined in claim 11 further comprising the step of further adjusting the data spread to provide a uniform minimum time margin between adjacent pulses.

13. A method of serial data communication for communicating data between electronic devices in a vehicle, said method comprising the steps of:

providing serial data that is to be transmitted onto a serial data bus in a vehicle;

forming pairs of data bits;

encoding said serial data by providing a high or low variable pulse width as a function of time to each of said pairs of data bits so as code said data bit pairs;

transmitting a series of said encoded serial data bits onto the serial data bus in the vehicle;

receiving said encoded data from said serial data bus with an electronic device; and decoding said received encoded serial data to decipher said data.

14. The method as defined in claim 13, wherein said step of decoding comprises determining a time period between adjacent bus voltage level edges, and determining a binary bit coding represented by said time pulse width.

15. The method as defined in claim 13, wherein said serial data communication is provided for use in vehicle cockpit electronics.

16. The method as defined in claim 13 further comprising the steps of:

generating a data spread as a function of time; and adjusting the data spread to remove time margins between adjacent pulses.

17. The method as defined in claim 16 further comprising the step of further adjusting said data spread to provide a uniform minimum time margin between adjacent pulses.

* * * * *